US012623337B2

(12) United States Patent
Itozawa et al.

(10) Patent No.: US 12,623,337 B2
(45) Date of Patent: May 12, 2026

(54) AUTOMATED CONVEYANCE SYSTEM

(71) Applicant: TOYOTA JIDOSHA KABUSHIKI KAISHA, Toyota (JP)

(72) Inventors: Yuta Itozawa, Nagoya (JP); Kunihiro Iwamoto, Nagakute (JP); Hirotaka Komura, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 563 days.

(21) Appl. No.: 18/169,581

(22) Filed: Feb. 15, 2023

(65) Prior Publication Data

US 2023/0286132 A1 Sep. 14, 2023

(30) Foreign Application Priority Data

Mar. 14, 2022 (JP) ................................. 2022-039113

(51) Int. Cl.
| | |
|---|---|
| *B25J 5/00* | (2006.01) |
| *B25J 19/02* | (2006.01) |
| *B65D 19/38* | (2006.01) |
| *B66F 9/06* | (2006.01) |
| *B66F 9/075* | (2006.01) |

(52) U.S. Cl.
CPC .............. *B25J 5/007* (2013.01); *B25J 19/02* (2013.01); *B65D 19/385* (2013.01); *B66F 9/063* (2013.01); *B66F 9/075* (2013.01)

(58) Field of Classification Search
CPC ....... B25J 5/007; B65D 19/385; G05D 1/021; B60D 2001/005; B66F 9/063; B66F 9/075
See application file for complete search history.

(56) References Cited

U.S. PATENT DOCUMENTS

| | | | |
|---|---|---|---|
| 2013/0166108 A1 | 6/2013 | Sturm | |
| 2017/0129705 A1 | 5/2017 | Luc et al. | |
| 2020/0223631 A1 | 7/2020 | Azumi | |
| 2020/0307667 A1 * | 10/2020 | Tang .................... | G05D 1/2446 |

FOREIGN PATENT DOCUMENTS

| | | | | |
|---|---|---|---|---|
| CN | 111422264 A | 7/2020 | | |
| DE | 102011085019 A1 * | 4/2012 | .......... | G05D 1/2427 |
| FR | 3039780 A1 * | 2/2017 | ............ | B65G 1/137 |
| JP | 05-112237 A | 5/1993 | | |
| JP | 2006-041208 A | 2/2006 | | |
| JP | 2013-136458 A | 7/2013 | | |
| JP | 2019091770 A * | 6/2019 | | |
| JP | 2019-148871 A | 9/2019 | | |
| JP | 2020-111160 A | 7/2020 | | |

* cited by examiner

*Primary Examiner* — Daniel J Colilla
(74) *Attorney, Agent, or Firm* — Sughrue Mion, PLLC

(57) ABSTRACT

An automated conveyance system that enables an autonomous mobile robot having a width larger than a distance between the legs of a load carrier to enter under the load carrier is provided. The automated conveyance system is an automated conveyance system for conveying a load carrier by an autonomous mobile robot entering below the load carrier, in which the load carrier includes a plurality of leg parts on sides of a bottom surface thereof, and at least one of the plurality of leg parts includes a U-shaped member, and the U-shaped member is disposed so that two end parts of the U-shaped member on an opening side thereof are arranged in a vertical direction.

10 Claims, 12 Drawing Sheets

10

20

10

20

11

12

AUTOMATED CONVEYANCE SYSTEM

CROSS REFERENCE TO RELATED APPLICATIONS

This application is based upon and claims the benefit of priority from Japanese patent application No. 2022-039113, filed on Mar. 14, 2022, the disclosure of which is incorporated herein in its entirety by reference.

BACKGROUND

The present disclosure relates to an automated conveyance system, and, in particular, to conveyance performed by an autonomous mobile robot.

In recent years, a technology for conveying an object by using an autonomous mobile robot in a factory or a warehouse has been developed. For example, Japanese Unexamined Patent Application Publication No. 2019-148871 discloses a technique in which an AGV including an external sensor for sensing the surrounding space and acquiring sensor data enters under a load carrier and conveys it.

SUMMARY

In general, as disclosed in Japanese Unexamined Patent Application Publication No. 2019-148871, when a robot enters under a load carrier in order to convey it, it is necessary to use a robot having a width smaller than a distance between the legs of the load carrier.

The present disclosure has been made in view of the above-described circumstances and an object thereof is to provide an automated conveyance system that enables an autonomous mobile robot having a width larger than a distance between the legs of a load carrier to enter under the load carrier.

A first exemplary aspect for achieving the above-described object is an automated conveyance system for conveying a load carrier by an autonomous mobile robot entering below the load carrier, in which the load carrier includes a plurality of leg parts on sides of a bottom surface thereof, and at least one of the plurality of leg parts includes a U-shaped member, and the U-shaped member is disposed so that two end parts of the U-shaped member on an opening side thereof are arranged in a vertical direction.

According to this automated conveyance system, since the U-shaped member is provided in the load carrier, it is possible to make the autonomous mobile robot having a width larger than a distance between the legs of the load carrier enter under the load carrier. Therefore, the flexibility in selecting a robot to be used is increased.

In the above-described aspect, the leg part comprising the U-shaped member may be provided on each of two of the sides of the bottom surface of the load carrier.

By the above structure, since the autonomous mobile robot can protrude from two sides of the load carrier, it is possible to make the autonomous mobile robot having a larger width enter under the load carrier.

In the above-described aspect, the two U-shaped members may be respectively provided on the two sides of the bottom surface of the load carrier so that they open in the same direction.

By the above structure, since the two U-shaped members are open in the same direction, this autonomous mobile robot can more easily enter under the load carrier than an autonomous mobile robot in which the two U-shaped members are not open in the same direction can.

In the above-described aspect, the two U-shaped members may be respectively provided on the two sides of the bottom surface of the load carrier so that they open in directions opposite to each other.

By the above structure, the autonomous mobile robot can enter under the load carrier from two directions.

In the above-described aspect, the leg part including the U-shaped member may be provided on one side of the bottom surface of the load carrier and the leg part including a ring-shaped member may be provided on the other side of the bottom surface of the load carrier.

By the above structure, since the autonomous mobile robot can protrude from two sides of the load carrier, it is possible to make the autonomous mobile robot having a larger width enter under the load carrier.

In the above-described aspect, the autonomous mobile robot may include a plate to be inserted into the U-shaped member, and a sensor may be provided in an end part of the plate.

By the above structure, the sensor can be positioned outside the load carrier. Therefore, it is possible to prevent a blind spot of the sensor from being generated by the load carrier.

In the above-described aspect, the autonomous mobile robot may include a first plate to be inserted into the U-shaped member and a second plate that is vertically disposed at an end of the first plate.

By the above structure, the sensor can be provided in the second plate. Therefore, it is possible to provide the sensor at a high position so that a wide area can be detected.

In the above-described aspect, the autonomous mobile robot may include a plate to be inserted into the U-shaped member, and wheels of the autonomous mobile robot may be provided below an end part of the plate.

By the above structure, when the plate of the autonomous mobile robot is inserted into the U-shaped member, the wheels of the autonomous mobile robot can be positioned outside the U-shaped member. Therefore, it is possible to convey the load carrier by using the autonomous mobile robot in which a distance between the wheels is long.

According to the present disclosure, it is possible to provide an automated conveyance system that enables an autonomous mobile robot having a width larger than a distance between the legs of a load carrier to enter under the load carrier.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure will be described hereinafter with reference to the drawings.

First Embodiment

An automated conveyance system according to this embodiment includes a load carrier 10 and an autonomous mobile robot 20, in which the autonomous mobile robot 20 enters below the load carrier 10, to thereby convey the load carrier 10. The load carrier 10 and the autonomous mobile robot 20 will be described hereinafter in detail with reference to the drawings.

Figure 1:
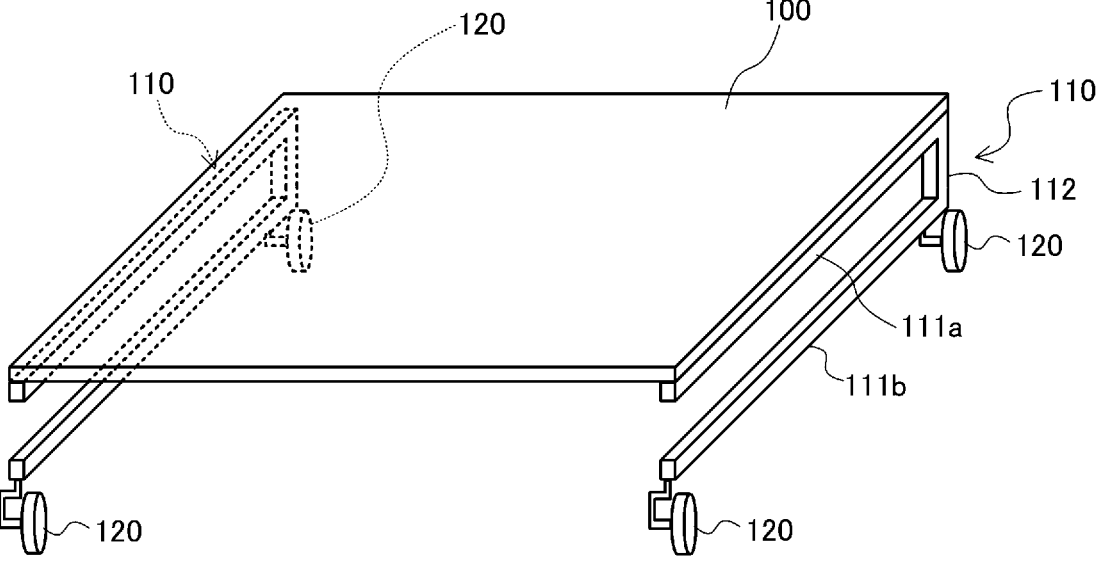
FIG. 1 is a schematic perspective view of a load carrier according to a first embodiment.

First, the load carrier 10 will be described. FIG. 1 is a schematic perspective view of the load carrier 10 according to the first embodiment. As shown in FIG. 1, the load carrier 10 includes a placement part 100. The load carrier 10 also includes a plurality of leg parts that support the load carrier 10 (the placement part 100) on sides of the bottom surface of the load carrier 10 (the placement part 100). In the example shown in FIG. 1, the load carrier 10 includes two leg parts, each of which includes a U-shaped member 110. That is, in the example shown in FIG. 1, the load carrier 10 includes two U-shaped members 110 as the leg parts. Further, in the example shown in FIG. 1, wheels 120 are provided below the U-shaped members 110 as components of the leg parts. The placement part 100 is a part of the load carrier 10 on which loads can be placed, and in the example shown in FIG. 1, it is composed of a rectangular plate disposed horizontally.

As shown in FIG. 1, on the bottom surface of the load carrier 10, that is, on the bottom surface of the placement part 100, two U-shaped members 110 are provided as the leg parts at a predetermined interval from each other in the width direction of the bottom surface. Specifically, the U-shaped member 110 (i.e., the leg part including the U-shaped member 110) is provided on each of two sides of the bottom surface of the load carrier 10 (the left and the right sides of the load carrier 10 in FIG. 1). Specifically, the U-shaped member 110 shown in FIG. 1 is composed of a first bar 111a and a second bar 111b that extend in the horizontal direction, and a pole 112 that connects the first bar 111a to the second bar 111b so that they are arranged so as to be spaced apart from each other and parallel to each other. Each of the U-shaped members 110 is disposed so that two end parts (an end part of the first bar 111a and an end part of the second bar 111b) of the U-shaped member on the opening side thereof are arranged in the vertical direction.

That is, the U-shaped member 110 is vertically disposed. Thus, each of the U-shaped members 110 is open toward the horizontal direction. In other words, the U-shaped member 110 is open toward the outside of the load carrier 10 in the horizontal direction. In particular, in this embodiment, the two U-shaped members 110 are respectively provided on the two sides of the bottom surface of the load carrier 10 so that they open in the same direction. That is, the directions of the end parts of the two U-shaped members 110 on the opening side thereof are the same.

A disposition of the U-shaped member 110 in this embodiment will be described in more detail. As shown in FIG. 1, the U-shaped member 110 is provided along a part of the outer periphery of the bottom surface of the load carrier 10 (one side of the bottom surface of the rectangle). In other words, the U-shaped member 110 is provided along the depth direction of the load carrier 10. That is, the U-shaped member 110 is provided so as to form the side surface of the load carrier 10. In this embodiment, a first U-shaped member 110 is provided along one side of the load carrier 10, and a second U-shaped member 110 is provided along the other side of the load carrier 10 opposite to the one side of the load carrier 10. As described above, the two U-shaped members 110 are aligned parallel to each other in the bottom surface of the load carrier 10.

At least one of a plurality of wheels 120 of the load carrier 10 is provided in each of the U-shaped members 110. In the example shown in FIG. 1, two wheels 120 are provided in each of the U-shaped members 110. In this embodiment, the wheels 120 are, for example, casters, and the horizontal direction of the wheels can be freely changed. Therefore, the load carrier 10 can be moved in any direction. However, the direction of the wheels 120 does not necessarily have to be changeable. In this case, the load carrier 10 is moved linearly only in the direction in which the wheels 120 face. Note that the wheels 120 may be omitted, and in place of the wheels 120, any components may be provided to enable the load carrier 10 to come into contact with the ground or the floor surface. That is, the load carrier 10 does not necessarily have to be able to travel. In this case, for example, the autonomous mobile robot 20 described later conveys the load carrier 10 by lifting the load carrier 10 from below and floating the load carrier 10 above the ground or the floor surface.

The wheels 120 are provided in the U-shaped member 110 on the lower side thereof. Specifically, the wheels 120 are provided in the second bar 111b, which is the lower bar of the two bars composing the U-shaped member 110. In the structure shown in FIG. 1, two of the wheels 120 are provided in the U-shaped member 110. Specifically, the wheels 120 are respectively provided near the end part of the U-shaped member 110 on the opening side thereof and near the opposite end part (the end part corresponding to the closed part of the U-shape). Note that two of the wheels 120 do not necessarily have to be provided in all of the U-shaped members 110. For example, when the load carrier 10 is supported at three points, only one wheel 120 may be provided in some of the U-shaped members 110.

Figure 2:
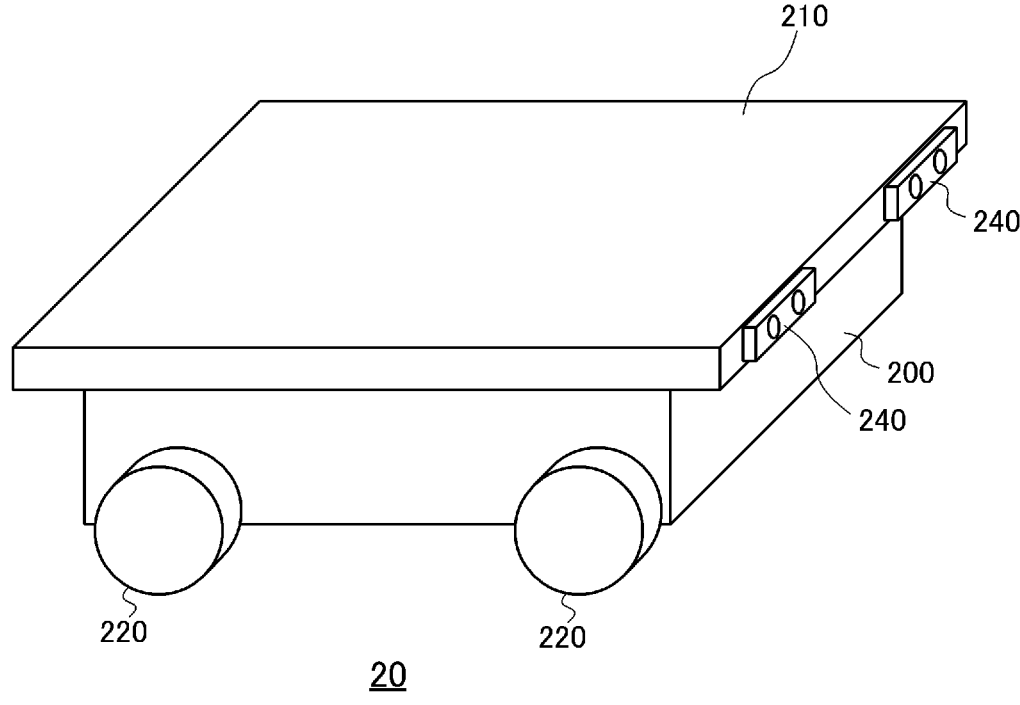
FIG. 2 is a schematic perspective view of an autonomous mobile robot according to the first embodiment.
Figure 3:
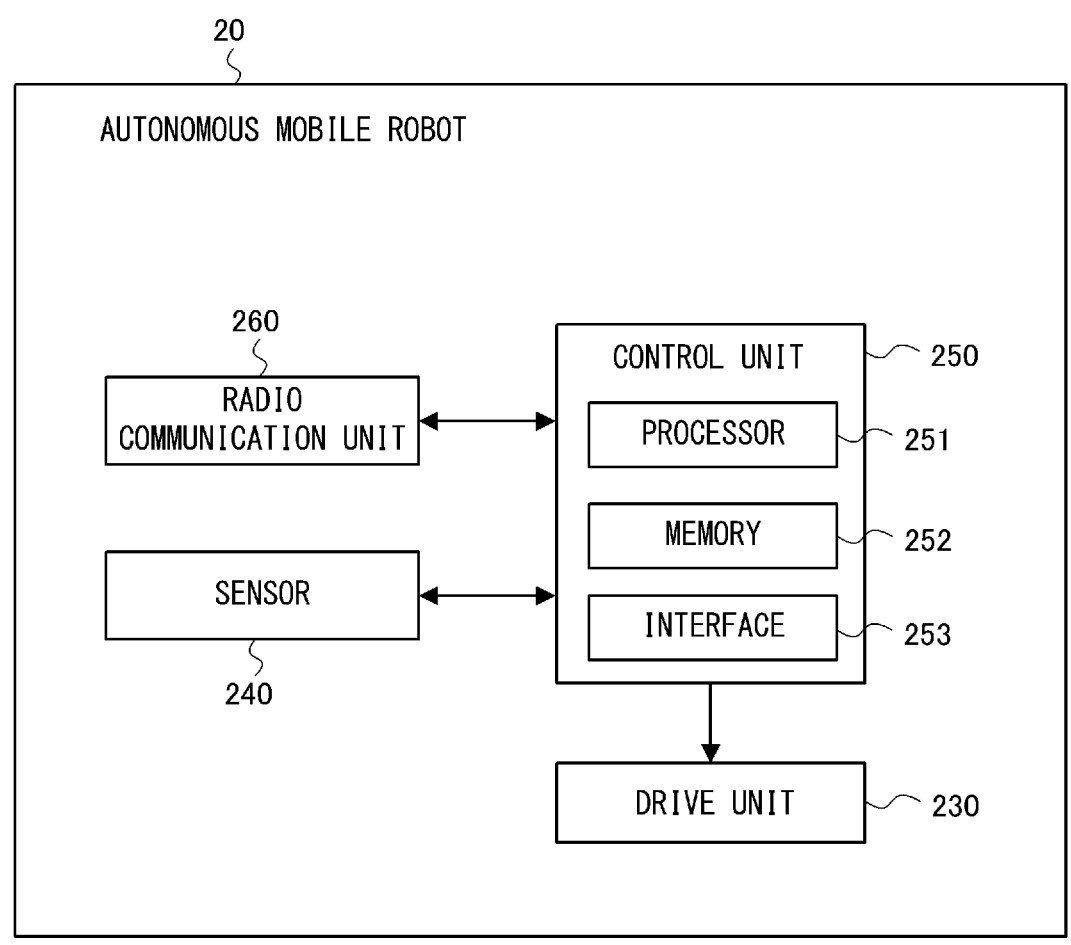
FIG. 3 is a block diagram showing a schematic system configuration of the autonomous mobile robot according to the first embodiment.

Next, the autonomous mobile robot 20 will be described. FIG. 2 is a schematic perspective view of the autonomous mobile robot 20 according to this embodiment. Further, FIG. 3 is a block diagram showing a schematic system configuration of the autonomous mobile robot 20 according to this embodiment. The autonomous mobile robot 20 is a robot that autonomously moves in a moving environment such as in a house, in an institution, in a warehouse, in a factory, or outdoors. In particular, the autonomous mobile robot 20 goes into under the load carrier 10 (namely, enters under the load carrier 10) and moves with the load carrier 10, to thereby convey the load carrier 10. In this embodiment, the autonomous mobile robot 20 includes a main body part 200 and a plate 210. The main body part 200 is a housing that houses devices required for the autonomous mobile robot 20. For example, a control unit 250, a drive unit 230, and a radio communication unit 260, which units will be described later, are mounted on the main body part 200, and at least some of these units may be mounted on a part of the autonomous mobile robot 20 other than the main body part 200. In the structure shown in FIG. 2, although the shape of the main body part 200 is a rectangular parallelepiped, the shape thereof is not limited to being a rectangular parallelepiped and may instead be any other shape. Further, in the structure shown in FIG. 2, the plate 210 is provided above the main body part 200 and has a rectangular shape corresponding to the shape of the load carrier 10. However, the shape of the plate 210 is not limited to a rectangular shape and may instead be a circular (elliptical) shape or the like. Note that the plate 210 may be provided integrally with the main body part 200. The plate 210 is provided horizontally, and the position of the plate 210 in the autonomous mobile robot 20 from the ground or the floor surface corresponds to the position of a gap between the first bar 111a and the second bar 111b of the U-shaped member 110 of the load carrier 10. In the following description, the gap between the first bar 111a and the second bar 111b of the U-shaped member 110 is referred to as a gap in the U-shaped member 110.

Further, the autonomous mobile robot 20 further includes wheels 220, the drive unit 230, sensors 240, the control unit 250 that controls the autonomous mobile robot 20, and the radio communication unit 260.

In this embodiment, although the wheel 220 is, for example, a mecanum wheel, this is merely an example. The autonomous mobile robot 20 may instead include a wheel of any structure as the wheel 220. Further, in the structure shown in FIG. 2, the autonomous mobile robot 20 includes two wheels 220 on each of the front and the rear sides thereof in FIG. 2. However, the positions where the wheels 220 are installed and the number of the wheels 220 installed are not limited to the ones shown in the structure in FIG. 2. The drive unit 230 includes an actuator such as a motor, and rotates the wheel 220 in response to a control signal from the control unit 250, to thereby enable the autonomous mobile robot 20 to move and turn in any direction. By this structure, the autonomous mobile robot 20 can move to any position. Further, when the plate 210 is configured to be able to move upward and downward, the drive unit 230 may further drive the plate 210 so that it moves upward and downward in response to a control signal from the control unit 250.

The sensor 240 is as sensor that detects environmental information (e.g., distance information, image information, or the like about any object present in an area around the autonomous mobile robot 20), which is information about the moving environment of the autonomous mobile robot 20. The sensor 240 is, for example, a LiDAR (light detection and ranging) sensor. However, it may instead be a camera (an RGB-D camera, a stereo camera) or the like. The sensor 240 detects environmental information required for the autonomous mobile robot 20 to move, and outputs the detected environmental information to the control unit 250. The control unit 250 generates a control signal based on information such as environmental information detected by the sensor 240 and map information of the moving environment, to thereby autonomously move the autonomous mobile robot 20. In this embodiment, the sensors 240 are provided in the end part of the plate 210. As described later, the sensor 240 is preferably provided in the end part of the plate 210 so that the visual field of the sensor 240 is not obstructed by the load carrier 10. However, it may instead be provided at a position in the autonomous mobile robot 20 other than the end part of the plate 210. In the structure shown in FIG. 2, although the sensors 240 are provided on a side surface of the end of the plate 210, it may instead be provided on an upper or a lower surface of the plate.

The radio communication unit 260 is a circuit that performs radio communication in order to communicate with a server, another robot, or the like as required, and includes, for example, a radio transmitting/receiving circuit and an antenna. Note that when the autonomous mobile robot 20 does not communicate with other devices, the radio communication unit 260 may be omitted.

The control unit 250 is an apparatus that controls the autonomous mobile robot 20, and includes a processor 251, a memory 252, and an interface 253. The processor 251, the memory 252, and the interface 253 are connected to one another through a data bus or the like.

The interface 253 is an input/output circuit that is used to communicate with other apparatuses such as the sensors 240, the drive unit 230, and the radio communication unit 260.

The memory 252 is formed by, for example, a combination of a volatile memory and a nonvolatile memory. The memory 252 is used to store software (a computer program) including at least one instruction executed by the processor 251, and data used for various types of processing performed in the autonomous mobile robot 20.

The processor 251 loads the software (the computer program) from the memory 252 and executes the loaded software, and by doing so, performs processing performed by the control unit 250 as described later.

The processor 251 may be, for example, a microprocessor, a Micro Processor Unit (MPU), or a Central Processing Unit (CPU). The processor 251 may include a plurality of processors. As described above, the control unit 250 is an apparatus that functions as a computer.

The program includes instructions (or software codes) that, when loaded into a computer, cause the computer to perform one or more of the functions described in the embodiment. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The details of the plate 210 provided in the autonomous mobile robot 20 will be described below. The plate 210 has a width longer than the width of the load carrier 10. In other words, the width of the plate 210 is longer than a distance between the legs of the load carrier 10 (a distance between the U-shaped member 110 on one side of the load carrier 10 and the U-shaped member 110 on the side opposite to the one side). Note that, in the plate 210, a part projecting outward in the horizontal direction with respect to the main body part 200 may be referred to as a projection part. Further, the plate 210 is thinner than the gap in the U-shaped member 110. Therefore, it is possible to insert the plate 210 into the gap in the U-shaped member 110. That is, the autonomous mobile robot 20 moves, whereby the plate 210 is inserted into the U-shaped member 110. In this case, the control unit 250 controls the autonomous mobile robot 20 so that it travels so as to enter the opening of the U-shaped member 110 and to proceed in the direction in which the U-shaped member 110 extends. Note that a person may move the load carrier 10, to thereby make the autonomous mobile robot 20 enter under the load carrier 10.

Figure 4:
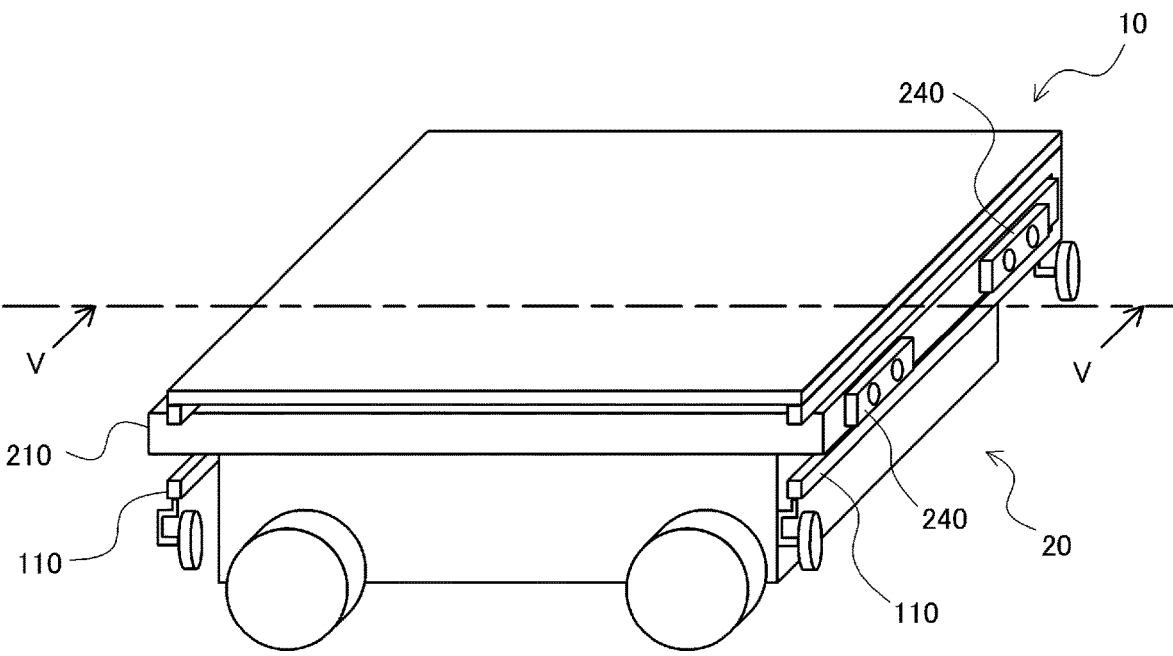
FIG. 4 is a schematic perspective view showing a state in which the autonomous mobile robot enters under the load carrier and is coupled to the load carrier.
Figure 5:
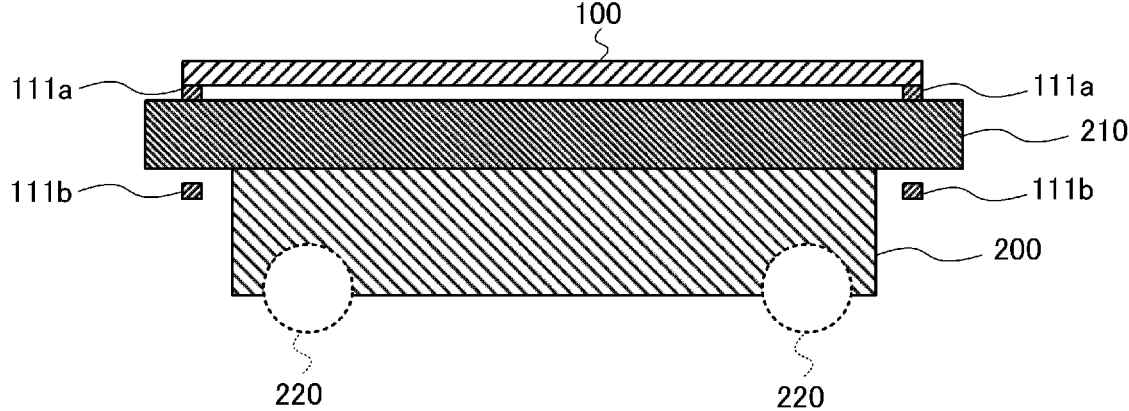
FIG. 5 is a schematic cross-sectional view of the autonomous mobile robot and the load carrier taken along a cutting line V-V in FIG. 4.

FIG. 4 is a schematic perspective view showing a state in which the autonomous mobile robot 20 enters under the load carrier 10 and is coupled to the load carrier 10. Further, FIG. 5 is a schematic cross-sectional view of the autonomous mobile robot 20 and the load carrier 10 taken along a cutting line V-V in FIG. 4. As shown in FIGS. 4 and 5, the end part (i.e., the projection part) of the plate 210 is inserted into the gap in the U-shaped members 110. This structure allows the end of the plate 210 in the width direction to project outward from the load carrier 10. As described above, according to this embodiment, since the U-shaped member 110 is provided in the load carrier 10, it is possible to make the autonomous mobile robot 20 having a width larger than a distance between the legs of the load carrier 10 enter under the load carrier 10. This allows the load carrier 10 to be supported by the large plate 210. In particular, in this embodiment, two U-shaped members 110 are respectively provided on two sides of the load carrier 10. Therefore, since the autonomous mobile robot 20 can protrude from the two sides of the load carrier 10, it is possible to make the autonomous mobile robot 20 having a larger width enter under the load carrier.

Further, in this embodiment, as described above, the sensors 240 are provided in the end parts of the plate 210, which are the parts that are to protrude outward in the horizontal direction from the U-shaped member 110. Therefore, even in a state in which the autonomous mobile robot 20 is under the load carrier 10, the visual fields of the sensors 240 are prevented from being obstructed by the load carrier 10. That is, since the sensors 240 can be positioned outside the load carrier 10, it is possible to prevent blind spots of the sensors 240 from being generated by the load carrier 10. Therefore, even when the autonomous mobile robot 20 enter under the load carrier 10, the sensors 240 can properly acquire information about the surroundings of the autonomous mobile robot 20.

Note that the autonomous mobile robot 20 enters under the load carrier 10 and then is coupled to the load carrier 10. That is, the relative positional relation between the autonomous mobile robot 20 and the load carrier 10 is fixed so that the load carrier 10 moves in accordance with the movement of the autonomous mobile robot 20. The aforementioned coupling can be performed using any method. For example, the coupling may be performed by mechanically connecting a lock member of the autonomous mobile robot 20 to a lock member of the load carrier 10, by the control unit 250 making the plate 210 move upward so as to lift the load carrier 10, or by generating a magnetic force by the control of the control unit 250.

Second Embodiment

Next, a second embodiment will be described. In the first embodiment, two U-shaped members 110 of the load carrier

10 are provided so that they open in the same direction. In this embodiment, unlike in the first embodiment, directions in which the two U-shaped members 110 open are different from each other. The differences between this embodiment and the above-described embodiment will be described hereinafter, and descriptions of the same or corresponding components and functions will be omitted as appropriate.

Figure 6:
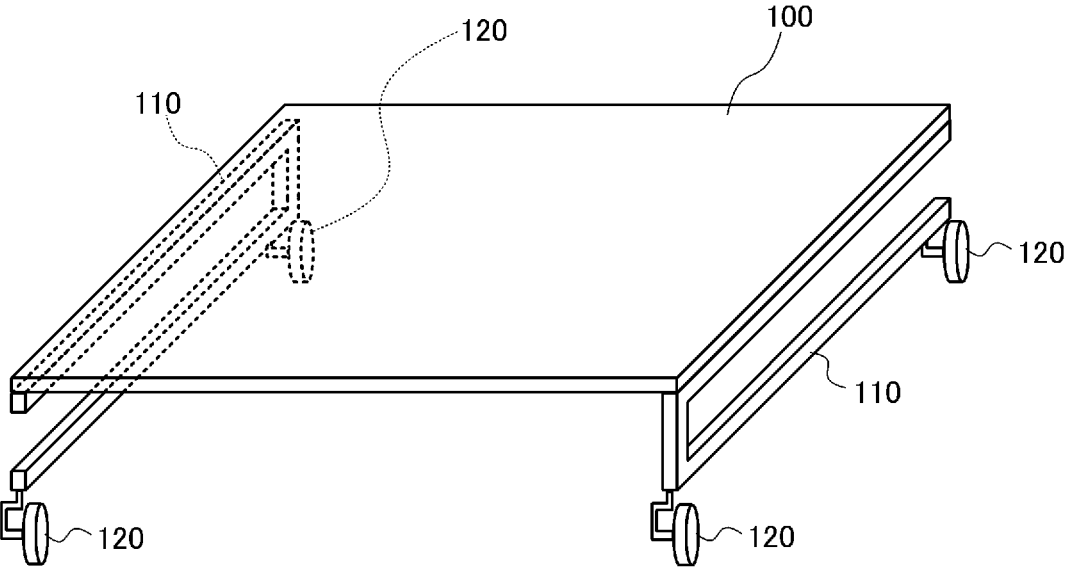
FIG. 6 is a schematic perspective view of a load carrier according to a second embodiment.
Figure 7:
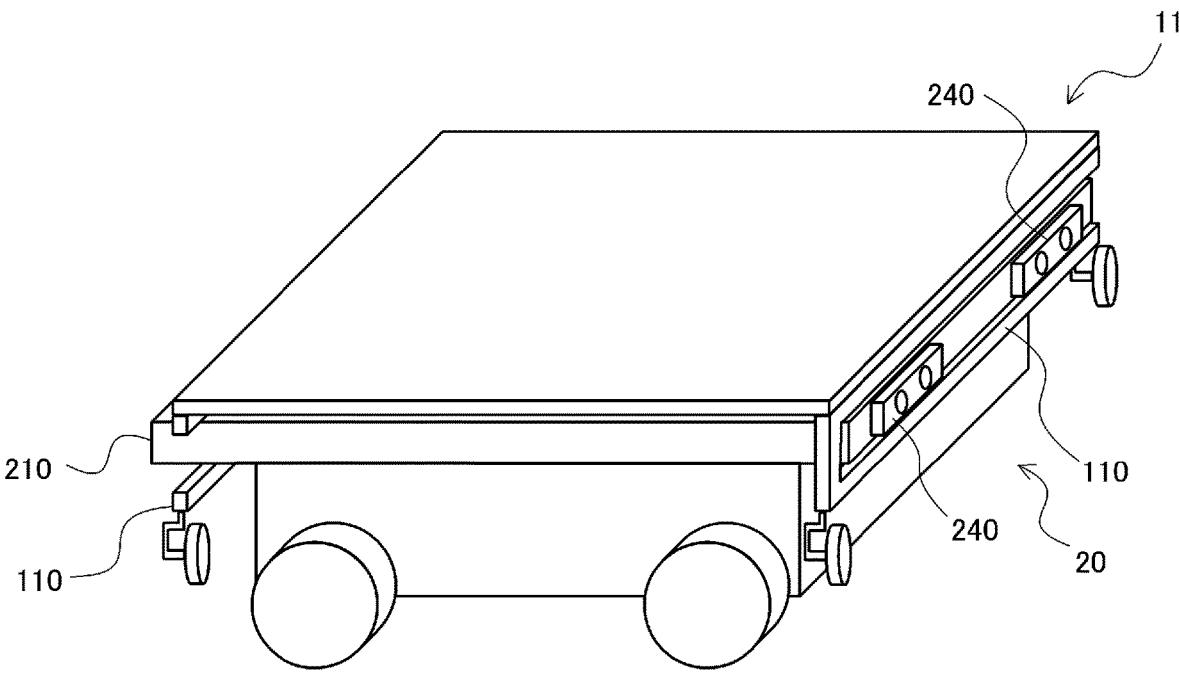
FIG. 7 is a schematic perspective view showing a state in which the autonomous mobile robot enters under the load carrier and is coupled to the load carrier.

FIG. 6 is a schematic perspective view of a load carrier 11 according to the second embodiment. As described above, the load carrier 11 differs from the load carrier 10 according to the first embodiment in that two U-shaped members 110 are provided so that they open in the directions opposite to each other. Further, FIG. 7 is a schematic perspective view showing a state in which the autonomous mobile robot 20 enters under the load carrier 11 and is coupled to the load carrier 11. As shown in FIG. 7, by the above structure, the plate 210 is inserted into the U-shaped members 110, whereby it is possible to make the autonomous mobile robot 20 having a width larger than a distance between the legs of the load carrier 11 enter under the load carrier 11. That is, it is possible to make the end of the plate 210 project outward from the load carrier 11 while the autonomous mobile robot 20 is positioned directly under the load carrier 11.

In this embodiment, the control unit 250 controls the autonomous mobile robot 20 so that it travels so as to enter the opening of one U-shaped member 110 and to proceed in the direction in which the one U-shaped member 110 extends, and when the autonomous mobile robot 20 has reached under the load carrier 11, the control unit 250 then controls the autonomous mobile robot 20 so that it travels toward the other U-shaped member 110. That is, the control unit 250 controls the autonomous mobile robot 20 so that it travels in the direction in which the U-shaped member 110 extends, and then controls the autonomous mobile robot 20 so that it travels in the direction perpendicular to the direction in which the U-shaped member 110 extends. As described above, the control unit 250 performs control so that the autonomous mobile robot 20 travels in an L-shape and two sides of the plate 210 are thereby inserted into the U-shaped members 110. In this embodiment, the aforementioned two-stage movement is performed. However, according to the load carrier 10 described in the first embodiment, two U-shaped members 110 are open in the same direction, and therefore two sides of the plate 210 are inserted into the U-shaped members 110 simply by making the autonomous mobile robot 20 travel in the direction in which the U-shaped member 110 extends. Therefore, in the first embodiment in which two U-shaped members 110 are open in the same direction, there is an advantage over the second embodiment in which two U-shaped members 110 are not open in the same direction in that the autonomous mobile robot 20 in the first embodiment can more easily enter under the load carrier 10 than the autonomous robot 20 in the second embodiment can. Note that, in the second embodiment, like in the first embodiment, a person may move the load carrier 11, to thereby make the autonomous mobile robot 20 enter under the load carrier 11.

In the first embodiment, since two U-shaped members 110 are provided so that they open in the same direction, the autonomous mobile robot 20 can enter under the load carrier 10 in only one direction. In contrast, in this embodiment, since two U-shaped members 110 are respectively provided on two sides of the bottom surface of the load carrier 11 so that they open in the directions opposite to each other, the autonomous mobile robot 20 can enter under the load carrier 11 from the two directions. Further, since the U-shaped members 110 in the second embodiment are open in the directions opposite to each other, strengths of the U-shaped members 110 against loads applied in the vertical direction can be obtained which are greater than those in the case in which two U-shaped members 110 are open in the same direction like in the first embodiment. That is, it is possible to prevent a deformation of the U-shaped members 110 (a deformation in which the openings of the U-shaped members 110 close) when a vertical force is applied to the load carrier.

Third Embodiment

Next, a third embodiment will be described. In the first embodiment, the load carrier 10 includes two U-shaped members 110. In this embodiment, unlike in the first embodiment, a load carrier 12 includes one U-shaped member 110 and one ring-shaped member 130. That is, although the third embodiment differs from the first embodiment in that one of the two U-shaped members 110 is replaced by the ring-shaped member 130, other components/structures are similar to those of the first embodiment. As described above, in the load carrier 12 according to this embodiment, a leg part including the U-shaped member 110 is provided on one side of the bottom surface of the load carrier 12, and a leg part including the ring-shaped member 130 is provided on the other side of the bottom surface of the load carrier 12. The differences between this embodiment and the above-described embodiments will be described hereinafter, and descriptions of the same or corresponding components and functions will be omitted as appropriate.

Figure 8:
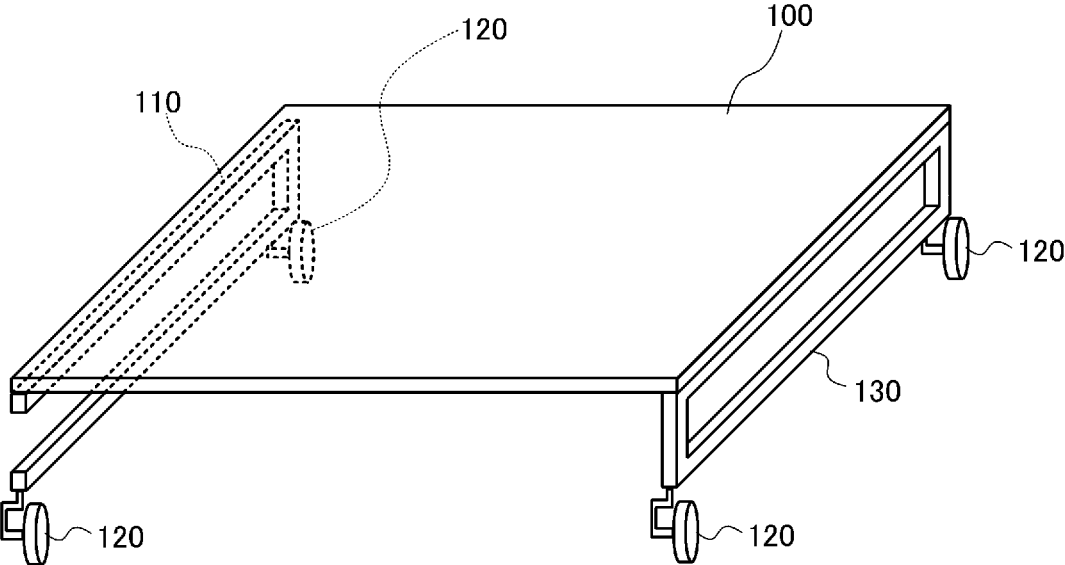
FIG. 8 is a schematic perspective view of a load carrier according to a third embodiment.

FIG. 8 is a schematic perspective view of the load carrier 12 according to the third embodiment. As shown in FIG. 8, the U-shaped member 110 and the ring-shaped member 130 are provided on the bottom surface of the load carrier 12, that is, on the bottom surface of the placement part 100, at a predetermined interval from each other in the width direction of the bottom surface of the load carrier 12. Specifically, the U-shaped member 110 is provided on one side (the left side of the load carrier 12 in FIG. 8) of the two sides of the bottom surface of the load carrier 12, and the ring-shaped member 130 is provided on the other side of the bottom surface of the load carrier 12 (the right side of the load carrier 12 in FIG. 8). As described above, in this embodiment, the load carrier 12 includes both of the U-shaped member 110 and the ring-shaped member 130 as the leg parts. Specifically, the ring-shaped member 130 shown in FIG. 8 is a rectangular ring-shaped member. The ring-shaped member 130 is vertically disposed. More specifically, the ring-shaped member 130 is provided so that a plane composed of a closed curve inside the ring-shaped member 130 is parallel to the vertical direction. As described above, the ring-shaped member 130 is provided so that another object can penetrate it in the horizontal direction. The vertical length of the space inside the ring-shaped member 130 is approximately the same as the size of the gap in the U-shaped member 110. Further, the position of the space inside the ring-shaped member 130 from the ground or the floor surface is approximately the same as the position of the gap in the U-shaped member 110 from the ground or the floor surface. The space inside the ring-shaped member 130 extends in the horizontal direction, and the longitudinal direction of the ring-shaped member 130 coincides with the horizontal direction. Further, the depth length of the space inside the ring-shaped member 130 is longer than the depth length of the plate 210. In the following description, the space inside the ring-shaped member 130 is referred to as a gap in the ring-shaped member 130.

In this embodiment, like in the above-described embodiments, the wheels 120 are further provided as components of the leg parts. Specifically, at least one of a plurality of wheels 120 of the load carrier 12 is provided in each of the U-shaped member 110 and the ring-shaped member 130. In the example shown in FIG. 8, two wheels 120 are provided in each of the U-shaped member 110 and the ring-shaped member 130. The wheels 120 of the ring-shaped member 130 are provided on the lower side of the ring-shaped member 130, and specifically, they are provided on the bottom of the rectangular ring-shaped member composing the ring-shaped member 130. More specifically, the wheels 120 are provided near both ends of the bottom of the ring-shaped member 130.

Although the autonomous mobile robot 20 according to this embodiment has a structure similar to that of the first embodiment, it has the following special features. The plate 210 is thinner than the gap in the U-shaped member 110 and the gap in the ring-shaped member 130. Therefore, it is possible to insert the plate 210 into the gap in the U-shaped member 110 and the gap in the ring-shaped member 130. That is, the autonomous mobile robot 20 moves, whereby the plate 210 is inserted into the U-shaped member 110 and the ring-shaped member 130.

As described above, in the load carrier 12 according to this embodiment, a leg part including the U-shaped member 110 is provided on one side of the bottom surface of the load carrier 12, and a leg part including the ring-shaped member 130 is provided on the other side of the bottom surface of the load carrier 12. By the above structure, the plate 210 is inserted into the U-shaped members 110 and the ring-shaped member 130, whereby it is possible to make the autonomous mobile robot 20 having a width larger than a distance between the legs of the load carrier 12 enter under the load carrier 12. That is, it is possible to make the end of the plate 210 project outward from the load carrier 12 while the autonomous mobile robot 20 is positioned directly under the load carrier 12. In particular, according to this embodiment, since the autonomous mobile robot 20 can protrude from two sides of the load carrier 12, it is possible to make the autonomous mobile robot 20 having a larger width enter under the load carrier 12.

In this embodiment, the control unit 250 controls the autonomous mobile robot 20 so that it travels so as to enter the opening of the U-shaped member 110 and to proceed in the direction in which the U-shaped member 110 extends, and when the autonomous mobile robot 20 has reached under the load carrier 12, the control unit 250 then controls the autonomous mobile robot 20 so that it travels toward the ring-shaped member 130. That is, the control unit 250 controls the autonomous mobile robot 20 so that it travels in the direction in which the U-shaped member 110 extends, and then controls the autonomous mobile robot 20 so that it travels in the direction perpendicular to the direction in which the U-shaped member 110 extends. As described above, the control unit 250 performs control so that the autonomous mobile robot 20 travels in an L-shape and the plate 210 are thereby inserted into the U-shaped member 110 and the ring-shaped member 130. Note that, in this embodiment, like in the above-described embodiments, a person may move the load carrier 12, to thereby make the autonomous mobile robot 20 enter under the load carrier 12.

In this embodiment, since one of the two U-shaped members 110 is replaced by the ring-shaped member 130, a strength of the load carrier 12 against a load applied in the vertical direction can be obtained which is greater than that in the case in which two U-shaped members 110 are used like in the first embodiment. That is, it is possible to prevent a deformation of the U-shaped member 110 (a deformation in which the opening of the U-shaped member 110 closes) when a vertical force is applied to the load carrier.

Fourth Embodiment

Figure 9:
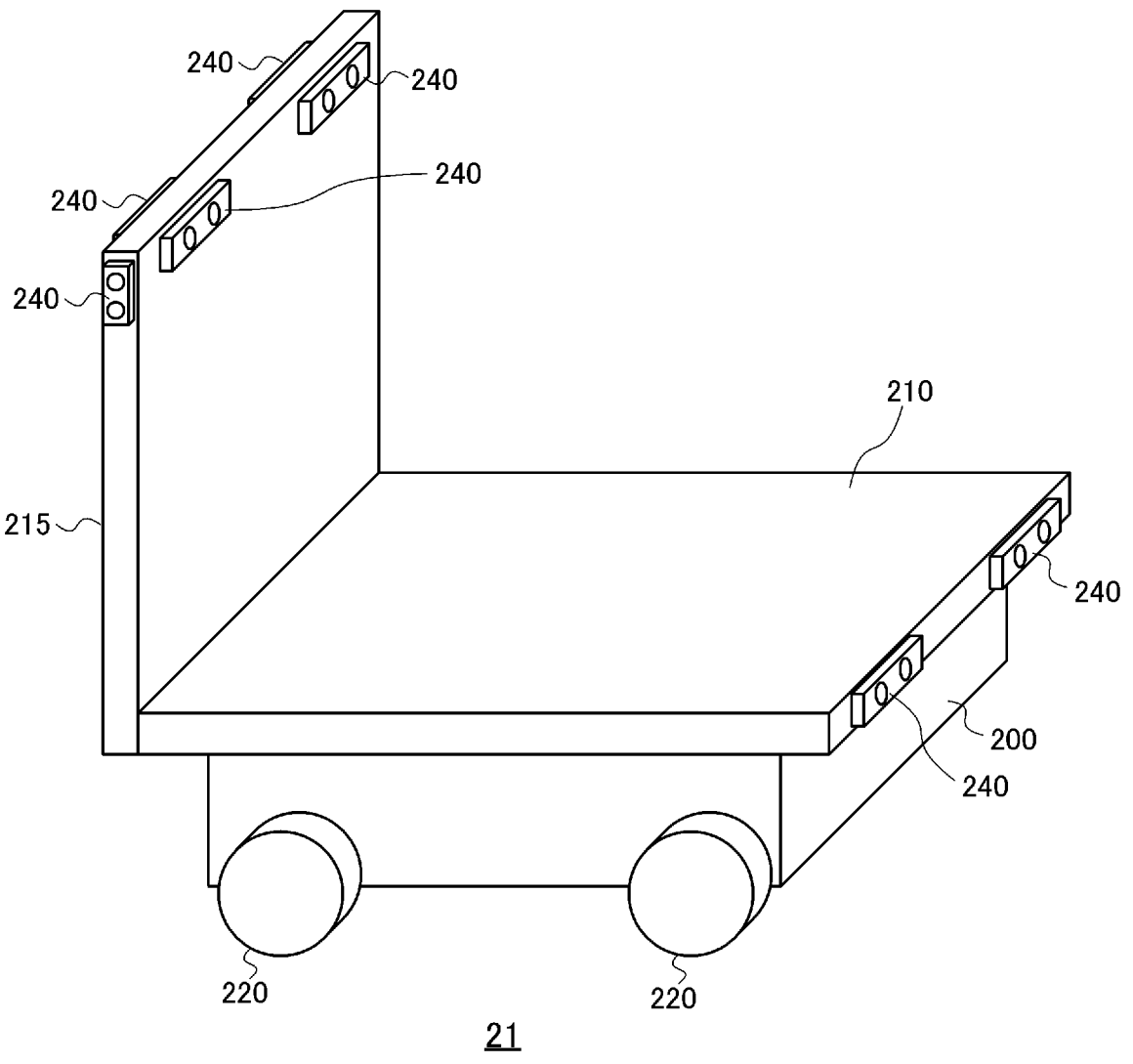
FIG. 9 is a schematic perspective view of an autonomous mobile robot according to a fourth embodiment.

Next, a fourth embodiment will be described. This embodiment differs from the first embodiment in that a structure of an autonomous mobile robot according to this embodiment is different from that of the first embodiment. FIG. 9 is a schematic perspective view of an autonomous mobile robot 21 according to the fourth embodiment. The autonomous mobile robot 21 according to the fourth embodiment differs from the autonomous mobile robot 20 according to the first embodiment in that a plate 215 that stands in the vertical direction is added to the autonomous mobile robot 21 according to the fourth embodiment. For example, the load carrier 10 is used for the autonomous mobile robot 21. However, the load carrier 11 or the load carrier 12 may instead be used. The differences between this embodiment and the above-described embodiments will be described hereinafter, and descriptions of the same or corresponding components and functions will be omitted as appropriate.

The plate 215 is vertically disposed at an end of the plate 210. More specifically, the plate 215 is provided so as to be perpendicular to the plate 210 at the end of the plate 210. Further, the sensors 240 are provided on upper sides of the plate 215. In the example shown in FIG. 9, although the sensors 240 are provided on the four sides, namely, the front, back, left, and right sides, of the plate 215, the sensors 240 may be provided on only some of these sides of the plate 215. Further, the sensors 240 may be provided at the end of the plate 215 on the upper side thereof.

Figure 10:
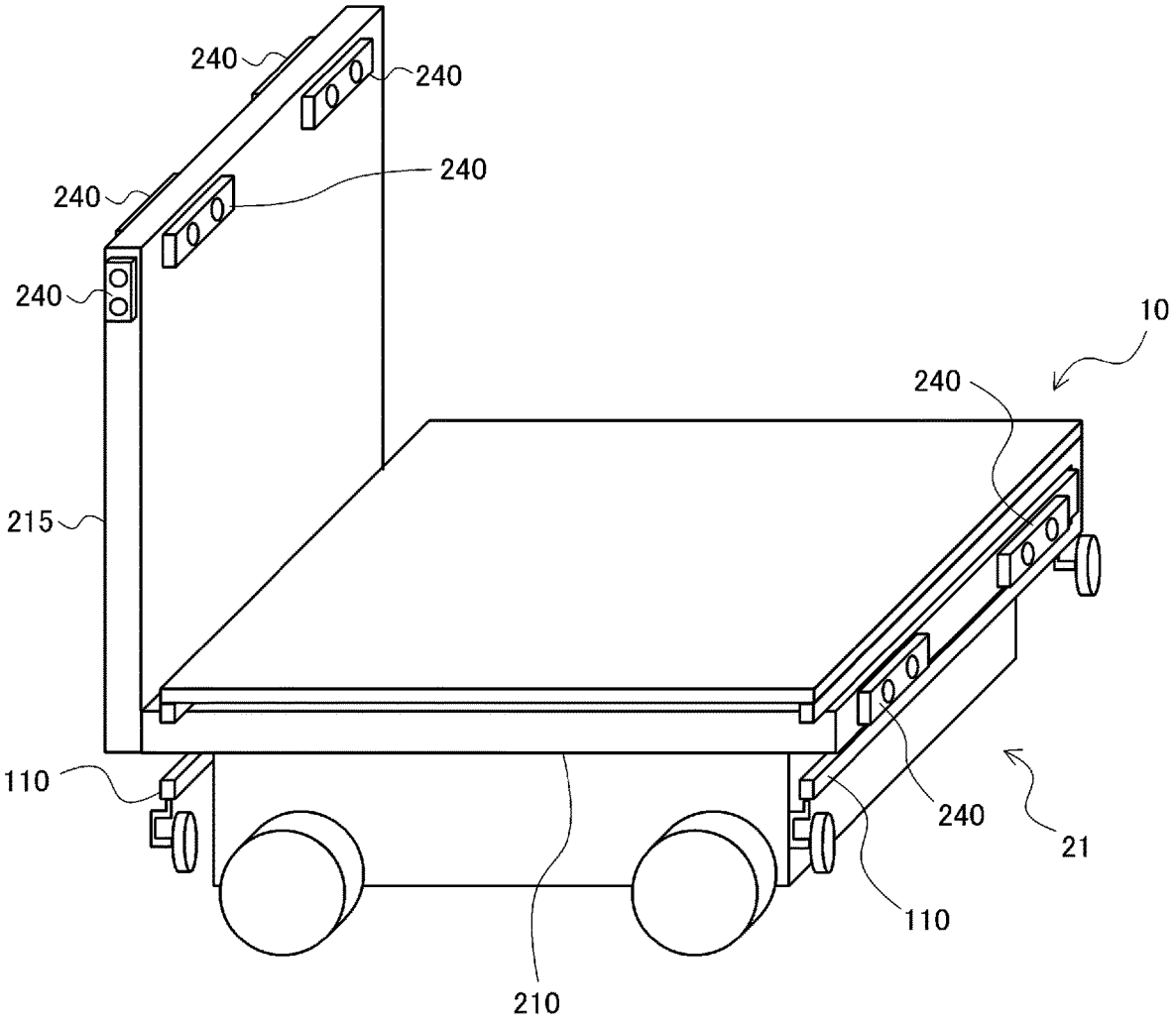
FIG. 10 is a schematic perspective view showing a state in which the autonomous mobile robot enters under the load carrier and is coupled to the load carrier.

FIG. 10 is a schematic perspective view showing a state in which the autonomous mobile robot 21 enters under the load carrier 10 and is coupled to the load carrier 10. As shown in FIG. 10, by the above structure, the plate 210 is inserted into the U-shaped members 110, whereby it is possible to make the autonomous mobile robot 21 having a width larger than a distance between the legs of the load carrier 10 enter under the load carrier 10. Further, in a state in which the autonomous mobile robot 21 is coupled to the load carrier 10, the plate 215 protrudes to the upper side of the load carrier 10. Therefore, even in the state in which the autonomous mobile robot 21 is coupled to the load carrier 10, a wide area can be detected by the sensors 240 provided in the plate 215. As described above, by providing the plate 215, which is vertically disposed at the end of the plate 210, in the autonomous mobile robot 21, the sensors 240 can be provided in the plate 215. Therefore, it is possible to provide the sensors 240 at a high position so that a wide area can be detected.

Fifth Embodiment

Figure 11:
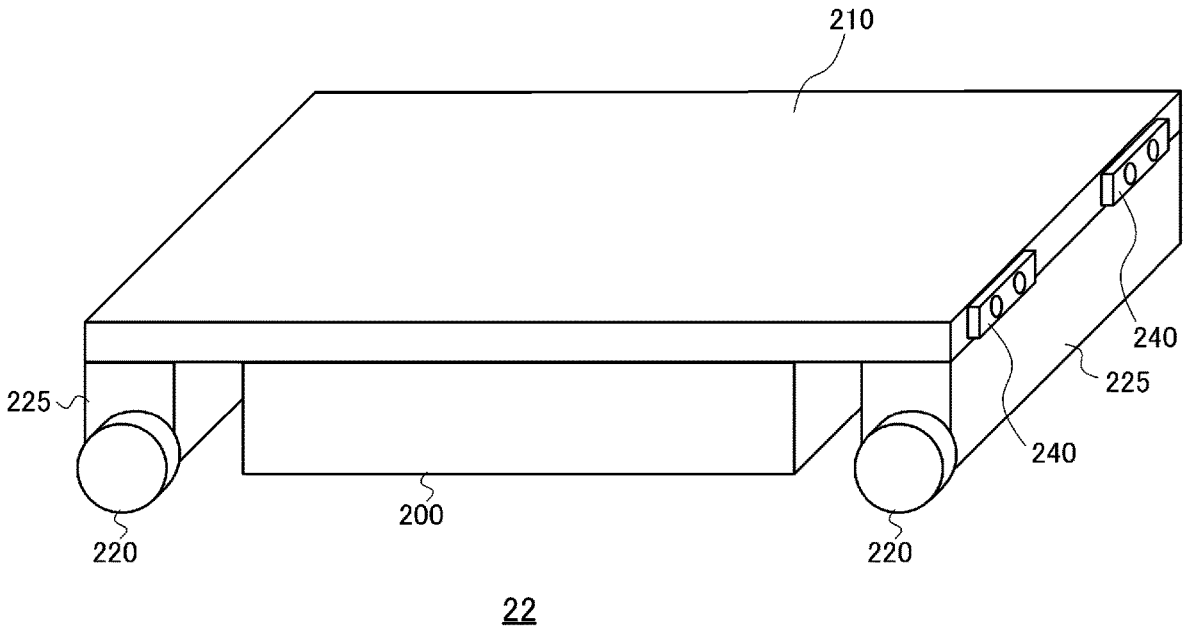
FIG. 11 is a schematic perspective view of an autonomous mobile robot according to a fifth embodiment.
Figure 12:
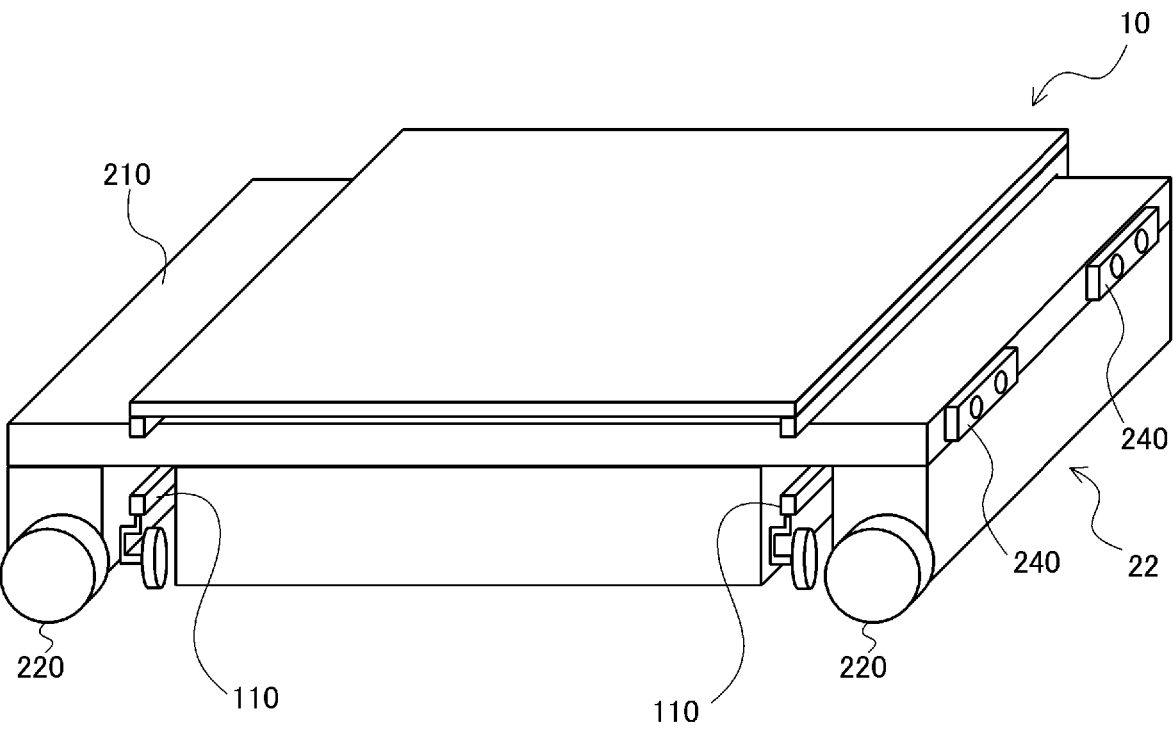
FIG. 12 is a schematic perspective view showing a state in which the autonomous mobile robot enters under the load carrier and is coupled to the load carrier.

Next, a fifth embodiment will be described. This embodiment, like the fourth embodiment, differs from the first embodiment in that a structure of an autonomous mobile robot according to this embodiment is different from that of the first embodiment. FIG. 11 is a schematic perspective view of an autonomous mobile robot 22 according to the fifth embodiment. Further, FIG. 12 is a schematic perspective view showing a state in which the autonomous mobile robot 22 enters under the load carrier 10 and is coupled to the load carrier 10. The autonomous mobile robot 22 according to the fifth embodiment differs from the autonomous mobile robot 20 according to the first embodiment in that the positions where the wheels 220 are provided are different from those of the first embodiment. The differences between this embodiment and the above-described embodiments will be described hereinafter, and descriptions of the same or corresponding components and functions will be omitted as appropriate.

In this embodiment, the wheels 220 of the autonomous mobile robot 22 are provided below the end parts of the plate 210. Specifically, the wheels 220 are provided below the end parts of the plate 210 that are to protrude outward in the horizontal direction from the U-shaped member 110 when the autonomous mobile robot 22 is coupled to the load carrier 10. In the example shown in FIG. 11, more specifically, the wheels 220 are provided in wheel connection members 225, which are provided so as to extend from under the end parts of the plate 210. Further, in the structure shown in FIG. 11, the autonomous mobile robot 22 includes two wheels 220 on each of the front and the rear sides thereof in FIG. 11. However, the position where the wheels 220 are installed and the number of the wheels 220 installed are not limited to the ones shown in the structure in FIG. 11. Note that, as shown in FIG. 11, a space (a space between the wheel connection member 225 and the main body part 200) for inserting the second bar 111*b* of the U-shaped member 110 is provided inside the wheels 220 that are provided in the end part of the plate 210. As shown in FIG. 12, by the above structure, the plate 210 is inserted into the U-shaped members 110, whereby it is possible to make the autonomous mobile robot 22 having a width larger than a distance between the legs of the load carrier 10 enter under the load carrier 10. Further, by the structure according to this embodiment, when the plate 210 of the autonomous mobile robot 22 is inserted into the U-shaped member 110, the wheels 220 of the autonomous mobile robot 22 can be positioned outside the U-shaped member 110. Therefore, it is possible to convey the load carrier by using the autonomous mobile robot 22 in which a distance between the wheels 220 is long. In other words, since the distance between the wheels 220 of the autonomous mobile robot 22 can be increased, the support polygon can be increased. Therefore, the stability of the autonomous mobile robot 22 can be increased. That is, the occurrences of falling of the autonomous mobile robot 22 can be reduced.

Note that the present disclosure is not limited to the above-described embodiments and may be changed as appropriate without departing from the scope of the present disclosure. For example, in the above examples, the autonomous mobile robot 20 can protrude from two sides of the load carrier. However, the autonomous mobile robot 20 does not necessarily have to protrude from two sides of the load carrier. In this case, the U-shaped member 110 may be used only for one side of the load carrier. That is, the load carrier only needs to include the U-shaped member 110 on at least one side of the bottom surface thereof.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An automated conveyance system comprising:

a load carrier; and an autonomous mobile robot configured to convey the load carrier by entering below the load carrier, wherein the load carrier comprises a plurality of leg parts on sides of a bottom thereof, at least one of the plurality of leg parts comprising a U-shaped member and the U-shaped member being disposed with two end parts of the U-shaped member on an opening side thereof arranged in a vertical direction; and the autonomous mobile robot comprises a main body and a plate disposed above the main body; and the autonomous mobile robot is configured to convey the load carrier via contact of the plate with the plurality of leg parts.

2. The automated conveyance system according to claim 1, wherein the at least one leg part comprising the U-shaped member comprises two leg parts and each leg part of the two leg parts is provided on respective sides of the bottom surface of the load carrier.

3. The automated conveyance system according to claim 2, wherein the two U-shaped members of the two leg parts are provided on the respective sides of the bottom surface of the load carrier and open in the same direction.

4. The automated conveyance system according to claim 3, wherein the autonomous mobile robot comprises:

a plurality of wheels provided below an end part of the plate, and wherein the plate is configured to be inserted into the two U-shaped members.

5. The automated conveyance system according to claim 2, wherein the two U-shaped members of the two leg parts are respectively provided on the respective sides of the bottom surface of the load carrier and open in directions opposite to each other.

6. The automated conveyance system according to claim 1, wherein the leg part comprising the U-shaped member is provided on one side of the bottom surface of the load carrier and a leg part of the plurality of leg parts comprising a ring-shaped member is provided on the other side of the bottom surface of the load carrier.

7. The automated conveyance system according to claim 1, wherein the plate is configured to be inserted into the U-shaped member, and a sensor provided at an end part of the plate.

8. The automated conveyance system according to claim 1, wherein the autonomous mobile robot comprises:

a second plate vertically disposed at an end of the plate, and wherein the plate is configured to be inserted into the U-shaped member.

9. The automated conveyance system according to claim 1, wherein the plate is configured to move in the vertical direction with respect to the main body.

10. The automated conveyance system according to claim 1, wherein the plate is configured to be inserted into the U-shaped member, and the autonomous mobile robot is configured to convey the load carrier via contact of the plate with the U-shaped member.

\* \* \* \* \*